United States Patent
Simplicio, Jr. et al.

(10) Patent No.: US 10,972,259 B2
(45) Date of Patent: Apr. 6, 2021

(54) LIGHTWEIGHT AND ESCROW-LESS AUTHENTICATED KEY AGREEMENT FOR THE INTERNET OF THINGS

(71) Applicants: LG ELECTRONICS INC., Seoul (KR); UNIVERSIDADE DE SAO PAULO, Sao Paulo (BR)

(72) Inventors: Marcos A. Simplicio, Jr., Sao Paulo (BR); Marcos V. M. Silva, Sao Paulo (BR); Renan C. A. Alves, Sao Paulo (BR)

(73) Assignees: LG ELECTRONICS INC., Seoul (KR); UNIVERSIDADE DE SAO PAULO, Sao Paulo (BR)

( * ) Notice: Subject to any disclaimer, the term of this patent is extended or adjusted under 35 U.S.C. 154(b) by 217 days.

(21) Appl. No.: 16/330,075

(22) PCT Filed: Sep. 5, 2017

(86) PCT No.: PCT/KR2017/009722
§ 371 (c)(1),
(2) Date: Mar. 1, 2019

(87) PCT Pub. No.: WO2018/044146
PCT Pub. Date: Mar. 8, 2018

(65) Prior Publication Data
US 2019/0215154 A1 Jul. 11, 2019

Related U.S. Application Data

(60) Provisional application No. 62/383,592, filed on Sep. 5, 2016.

(51) Int. Cl.
*H04L 9/08* (2006.01)
*H04L 9/30* (2006.01)
(Continued)

(52) U.S. Cl.
CPC .......... *H04L 9/0847* (2013.01); *G06F 21/602* (2013.01); *G06F 21/6236* (2013.01);
(Continued)

(58) Field of Classification Search
CPC ... H04L 9/3066; H04L 9/3073; H04L 9/0841; H04L 9/0866; H04L 9/0847; G06F 21/6236; G06F 21/602
See application file for complete search history.

(56) References Cited

U.S. PATENT DOCUMENTS 8,209,533 B2 * 6/2012 Struik .................. H04L 9/0844
713/168
9,143,324 B2 * 9/2015 Marlow ................ H04L 9/0861
(Continued)

OTHER PUBLICATIONS

PCT International Application No. PCT/KR2017/009722, Notification of Transmittal of the International Search Report and the Written Opinion of the International Searching Authority, or Declaration dated Dec. 8, 2017, 10 pages.
(Continued)

*Primary Examiner* — Mohammad A Siddiqi
(74) *Attorney, Agent, or Firm* — Lee, Hong, Degerman, Kang & Waimey

(57) ABSTRACT

A method for computing a shared key (K) for encrypting data between a first device and a second device. The method includes communicating a first private ephemeral key (XA), and a first parameter set (YA) to a second device. The first parameter set (YA) includes identity data (IDA) that identifies the first device, a random point (VA) on an elliptic curve, and a first public key (UA). The first device receives a second private ephemeral key (XB) and a second parameter set (YB). The second parameter set (YB) includes identity data (IDB) that identifies the second device, a random point (VB) on the elliptic curve, and a second public key (UB). Verifying operations are performed to verify the (Continued)

second public key (UB) and the second private ephemeral key (XB) as valid. A shared key (K) is then computed based at least on the first parameter set (YA), the second parameter set (YB), the first private ephemeral key (XA), and the second private ephemeral key (XB).

16 Claims, 7 Drawing Sheets

(51) Int. Cl.
G06F 21/60 (2013.01)
G06F 21/62 (2013.01)
(52) U.S. Cl.
CPC .......... *H04L 9/0841* (2013.01); *H04L 9/0866* (2013.01); *H04L 9/3066* (2013.01); *H04L 9/3073* (2013.01)

(56) References Cited

U.S. PATENT DOCUMENTS

| | | | | |
|---|---|---|---|---|
| 2008/0065892 A1* | 3/2008 | Bailey | .................. | H04L 9/3228 713/171 |
| 2008/0288773 A1* | 11/2008 | Nguyen | .................. | H04L 9/321 713/155 |
| 2012/0023564 A1 | 1/2012 | Tsiatsis et al. | | |
| 2015/0143125 A1* | 5/2015 | Nix | ...................... | H04L 9/0841 713/171 |
| 2015/0213433 A1* | 7/2015 | Khan | .................... | H04L 9/0844 705/71 |
| 2015/0281961 A1 | 10/2015 | Lee et al. | | |
| 2016/0050561 A1 | 2/2016 | Pudney et al. | | |
| 2017/0201380 A1* | 7/2017 | Schaap | ................. | H04W 12/04 |
| 2017/0303134 A1* | 10/2017 | Ho | ..................... | H04W 12/003 |
| 2017/0346641 A1* | 11/2017 | Medvinsky | ........... | H04L 9/0861 |
| 2018/0062854 A1* | 3/2018 | Kancharla | ............... | H04L 9/083 |

OTHER PUBLICATIONS

Sarr, A. et al., "A New Security Model for Authenticated Key Agreement", Jan. 2012, See Section 4, 24 pages.

Farouk, A. et al., "Efficient Pairing-Free, Certificateless Two-Party Authenticated Key Agreement Protocol for Grid Computing", May 2014, See Sections III and IV; and Figures 2 and 3, 7 pages.

* cited by examiner

[Fig. 1]
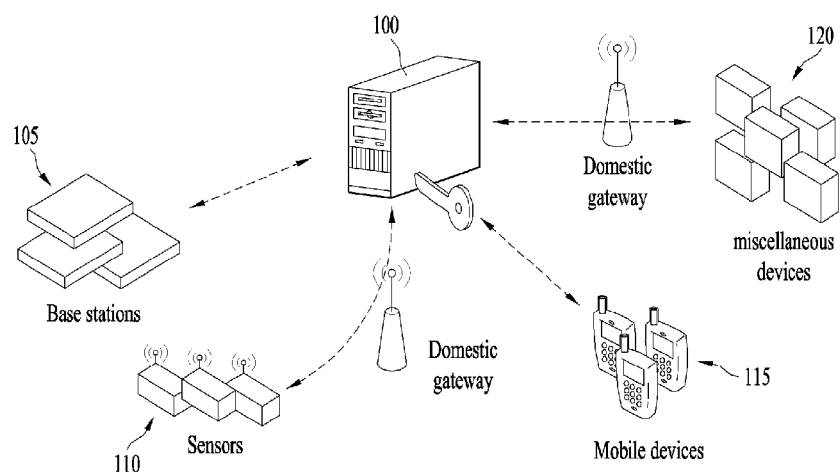

[Fig. 2]

Computational cost of different AKA schemes, in terms of
point multiplications / additions (PM / PA ) and hashes ( H )

| Protocol | PM | PA | PM |
|---|---|---|---|
| Ni et al. | 6 | 3 | 2 |
| Tu et al. | 5 | 3 | 3 |
| Tong et al. | 5 | 1 | 3 |
| Islam et al. ( flawed) | 4 | 0 | 3 |
| Young - jin et al. ( flawed) | 4 | 3 | 2 |
| Farouk ( flawed) | 3 | 5 | 2 |
| ( S ) MQV | 4 | 2 | 4 |

[Fig. 3]
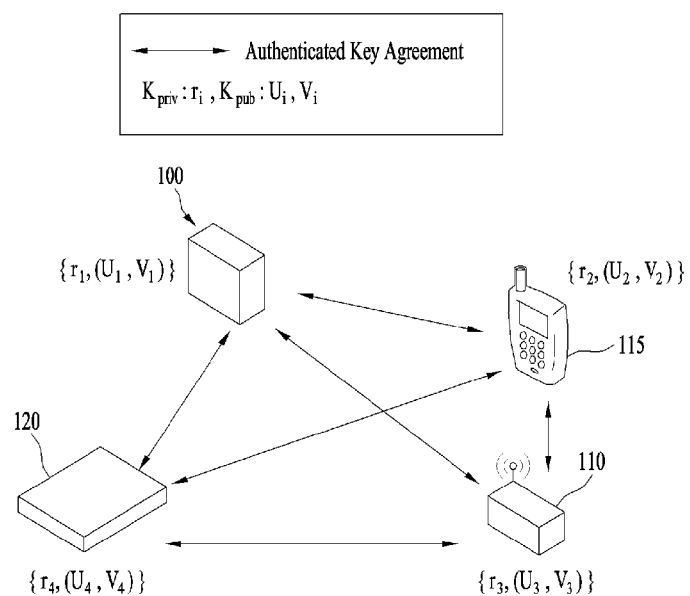

[Fig. 4]
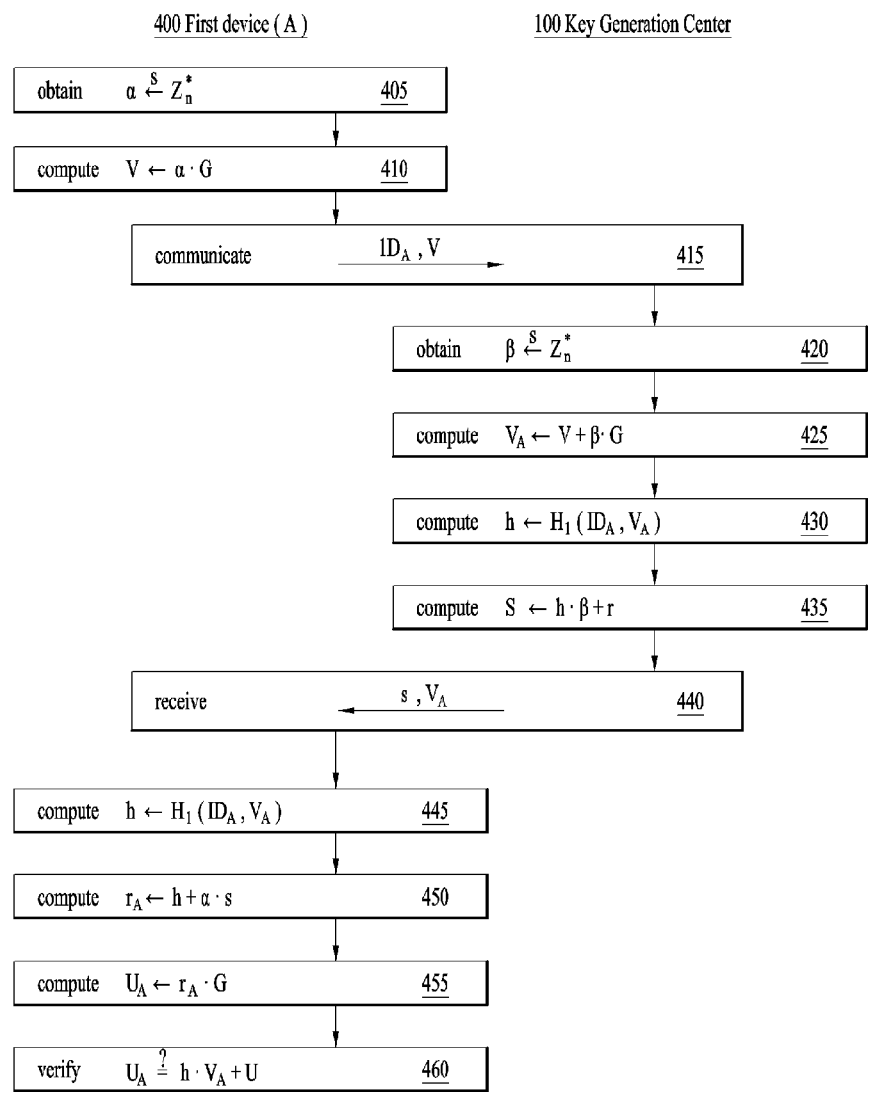

[Fig. 5]
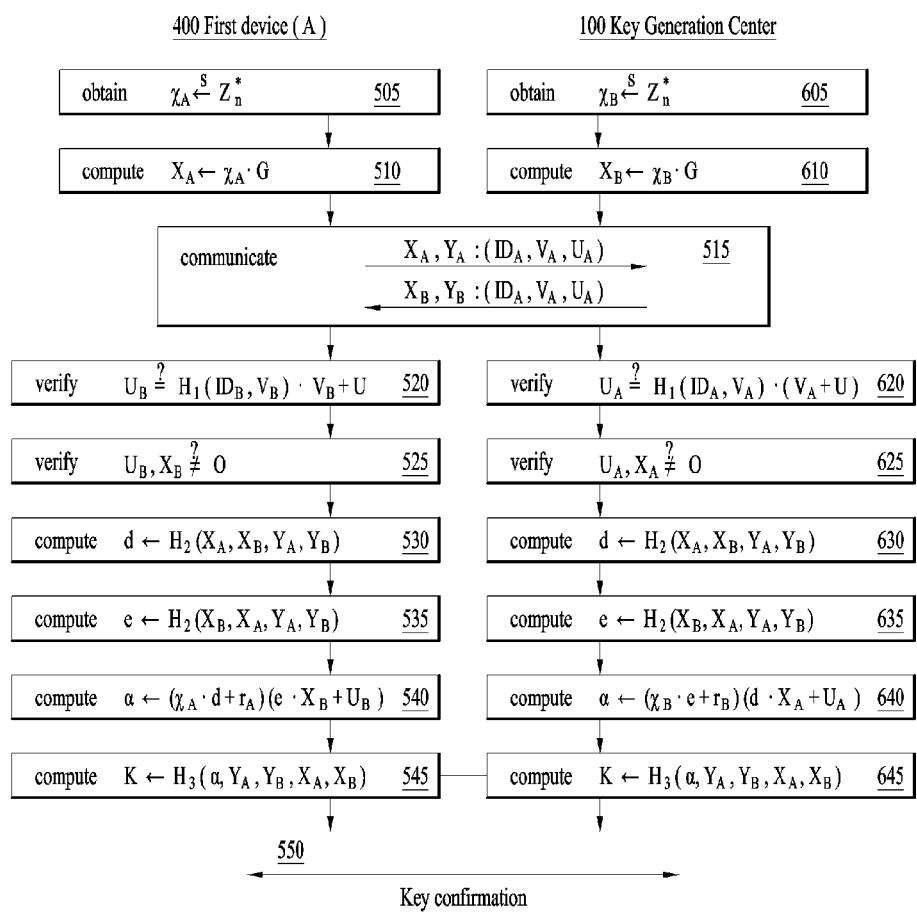

[Fig. 6]
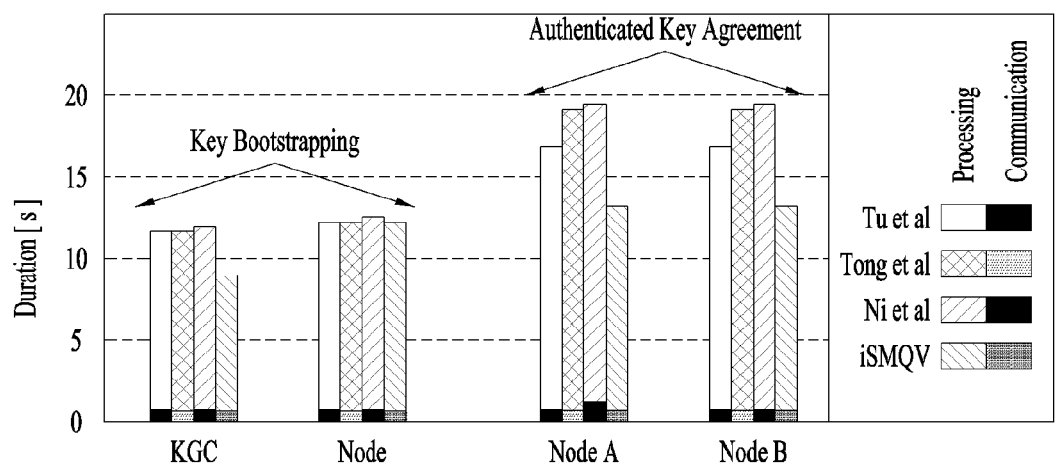
[Fig. 7]
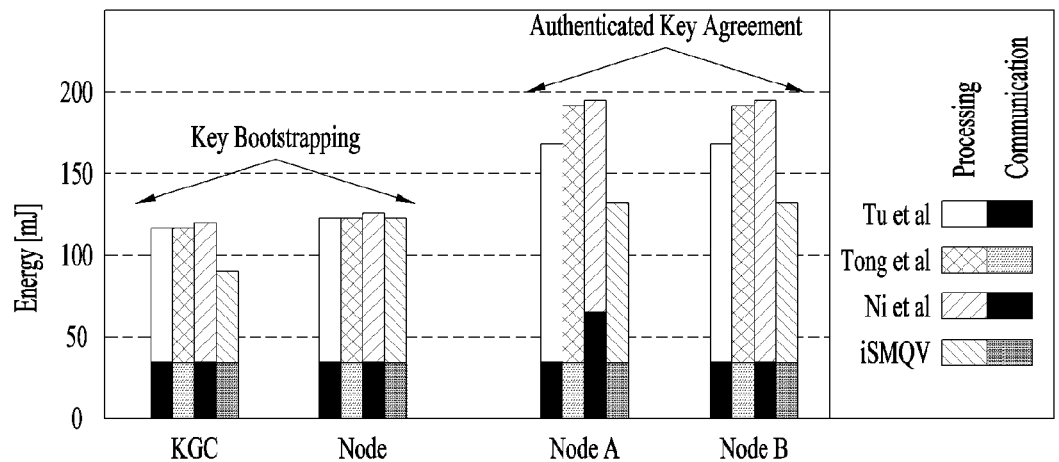

[Fig. 8]
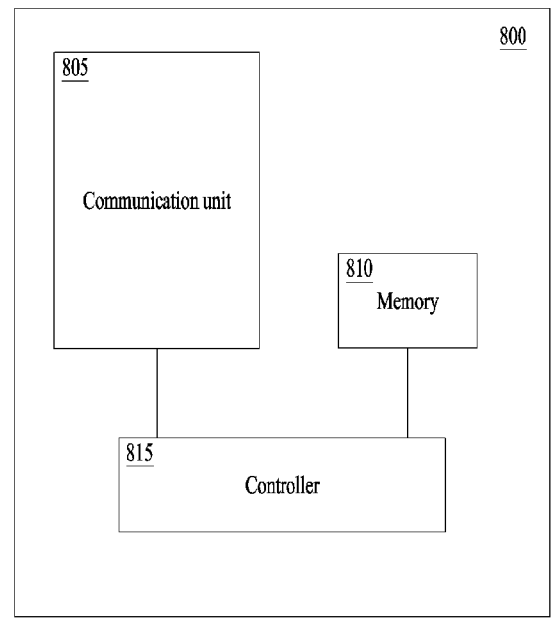

LIGHTWEIGHT AND ESCROW-LESS AUTHENTICATED KEY AGREEMENT FOR THE INTERNET OF THINGS

CROSS-REFERENCE TO RELATED APPLICATIONS

This application is the National Stage filing under 35 U.S.C. 371 of International Application No. PCT/KR2017/009722, filed on Sep. 5, 2017, which claims the benefit of U.S. Provisional Application No. 62/383,592, filed on Sep. 5, 2016, the contents of which are all hereby incorporated by reference herein in their entirety.

TECHNICAL FIELD

The present invention generally relates to data encryption, and in particular, to using implicitly-certified authentication key agreement.

BACKGROUND ART

Security has become increasingly more important for networks. One example of such networks is wide wireless sensor network (WSN) deployments, sometimes referred to as the Internet of Things (IoT). However, the resource-constrained nature of sensors restrict the cryptographic algorithms and protocols that can be used in such platforms. Such restrictions apply especially to authenticated key agreement (AKA) protocols for bootstrapping keys between authorized nodes. In traditional networks, such schemes involve the transmission of quite large certificates and the execution of memory intensive and processing intensive cryptographic algorithms, which in some cases are not suitable for WSNs. Although some lightweight WSN-oriented schemes exist, most of them focus on small deployments where key-escrow is possible (e.g., a fully trusted authority knows the private keys of all nodes).

DISCLOSURE OF INVENTION

Solution to Problem

In accordance with an embodiment, a method for computing a shared key (K) for encrypting data includes communicating, from a first device to a second device, a first private ephemeral key ($X_A$), and a first parameter set ($Y_A$), wherein the first parameter set ($Y_A$) includes identity data ($ID_A$) that identifies the first device, a random point ($V_A$) on an elliptic curve, and a first public key ($U_A$); receiving, from the second device, a second private ephemeral key ($X_B$) and a second parameter set ($Y_B$), wherein the second parameter set ($Y_B$) includes identity data ($ID_B$) that identifies the second device, a random point ($V_B$) on the elliptic curve, and a second public key ($U_B$); verifying the second public key ($U_B$) as valid when the second public key ($U_B$) equals a hash function ($H_1$) applied to the identity data ($ID_B$) and the random point ($V_B$) on the elliptic curve, which is multiplied by the random point ($V_B$) on the elliptic curve, and as added to a public key (U) of a trusted agent; verifying the second public key ($U_B$) and the second private ephemeral key ($X_B$) as valid when both the second public key ($U_B$) and the second private ephemeral key ($X_B$) are not a point at infinity on the elliptic curve; and computing the shared key (K) based at least on the first parameter set ($Y_A$), the second parameter set ($Y_B$), the first private ephemeral key ($X_A$), and the second private ephemeral key ($X_B$).

In accordance with another embodiment, an apparatus for computing a shared key (K) for encrypting data includes a memory configured to store identity data ($ID_A$) that identifies the apparatus; a communication unit; and a controller operatively coupled to the communication unit. The controller is configured to: control the communication unit to communicate to a second device, a first private ephemeral key ($X_A$), and a first parameter set ($Y_A$), wherein the first parameter set ($Y_A$) includes the identity data ($ID_A$) that identifies the apparatus, a random point ($V_A$) on an elliptic curve, and a first public key ($U_A$); control the communication unit to receive, from the second device, a second private ephemeral key ($X_B$) and a second parameter set ($Y_B$), wherein the second parameter set ($Y_B$) includes identity data ($ID_B$) that identifies the second device, a random point ($V_B$) on the elliptic curve, and a second public key ($U_B$); verify the second public key ($U_B$) as valid when the second public key ($U_B$) equals a hash function ($H_1$) applied to the identity data ($ID_B$) and the random point ($V_B$) on the elliptic curve, which is multiplied by the random point ($V_B$) on the elliptic curve, and as added to a public key (U) of a trusted agent; verify the second public key ($U_B$) and the second private ephemeral key ($X_B$) as valid when both the second public key ($U_B$) and the second private ephemeral key ($X_B$) are not a point at infinity on the elliptic curve; and compute the shared key (K) based at least on the first parameter set ($Y_A$), the second parameter set ($Y_B$), the first private ephemeral key ($X_A$), and the second private ephemeral key ($X_B$).

These and other embodiments will also become readily apparent to those skilled in the art from the following detailed description of the embodiments having reference to the attached figures, the invention not being limited to any particular embodiment disclosed.

Advantageous Effects of Invention

One embodiment of the present invention affects data encryption.

BRIEF DESCRIPTION OF DRAWINGS

The above and other aspects, features, and advantages of the present invention will become more apparent upon consideration of the following description of preferred embodiments, taken in conjunction with the accompanying drawing figures.

FIG. 1 depicts a network having a number of different devices in communication with a trusted agent in accordance with an embodiment of the present invention.

FIG. 2 is a table showing computations for an assortment of protocols.

FIG. 3 is a block diagram of a network utilizing an efficient WSN-oriented AKA scheme that is both pairing-free and escrow-less.

FIG. 4 is a flowchart of a method of computing implicitly certified public and private key pairs for encrypting data in accordance with an embodiment of the present invention.

FIG. 5 is a flowchart of a method for computing a shared key for encrypting data between first and second devices in accordance with further embodiments of the present invention.

FIG. 6 is a table showing average running times of key agreement protocols.

FIG. 7 is a table depicting average energy consumption for different AKA schemes.

FIG. 8 is a block diagram of a device in accordance with embodiments of the present invention.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Aiming to identify AKA solutions suitable for the IoT scenario, for example, embodiments will be presented which provide lightweight and escrow-free schemes. One example includes use of a strengthened-Menezes-Qu-Vanstone (SMQV) with implicit certificates in order to provide a secure and lightweight AKA scheme.

FIG. 1 depicts a network having a number of different devices in communication with a trusted agent in accordance with an embodiment of the present invention. In particular, the network includes a key generation center 100 in communication with various devices, such as base stations 105, sensors 110, mobile devices 115, and miscellaneous devices 120. Each of the depicted devices may be configured to engage in authenticated key agreement using, for example, the techniques discussed in more detail below with regard to FIGS. 4-5.

Referring still to FIG. 1, as one example, wireless sensor networks (WSNs) are a type of ad-hoc network implemented as several autonomous sensor nodes, also known as motes. Such motes are but one example of sensors 110. The interest in WSNs is that they can be deployed in the area of interest for gathering and processing data from their surroundings (e.g., mechanical, thermal, biological, chemical, and optical readings). Thus, they enable several applications, including environment and habitat monitoring, support for logistics, health care, and emergency response. Sensors also form a part of the IoT in which they interact with actuators for building a pervasive smart network.

Motes usually have a limited amount of resources such as storage, memory, processing power, bandwidth and, especially, energy. Therefore, one design goal of WSN-oriented security protocols is to optimize processing and network usage, allowing sensors to preserve energy, and thus, extend the network's lifetime. Current systems have a certain level of feasibility of symmetric cryptography for encryption and authentication in WSNs. The task of bootstrapping the required keys for using those algorithms is an area for improvement.

Some schemes rely almost exclusively on key pre-distribution, thereby avoiding costs involved in asymmetric protocols for dynamic key generation and distribution at the cost of higher susceptibility to node capture and lower scalability. The development of highly efficient cryptographic libraries with support to Elliptic Curve Cryptography (ECC) and bilinear pairings facilitate improvement for asymmetric primitives for WSNs In some cases, AKA solutions include following an ID-based paradigm, which uses identities (e.g., a label or network address) instead of random strings as public keys. This allows keys to be dynamically generated with fewer and smaller messages than solutions relying on Public Key Infrastructure (PKI) certificates for public key validation, which in turn saves energy and other resources.

Some existing cryptanalytic systems have shown the low security of the "pairing-friendly" elliptic curves in characteristic 2 that enable the processing and memory optimizations found in some ID-based AKA schemes. In addition, since the ID-based approach typically requires a trusted authority (TA) that issues, and thus knows, all private keys in the network, it may not always be a desired approach in the context in IoT environments, for example. This key escrow property of the ID-based approach may be acceptable in small deployments, since in such scenarios the TA can simply be a computer controlled by the motes' owner. However, in the large scale scenario in IoT, it is often desirable to implement the TA as a (federated) remote server. This server could then be accessed (e.g., via a domestic gateway) by multiple motes, owned by different users, for bootstrapping the keys that allow those sensors to engage in secure communications. In these embodiments, all users may not fully trust the server with the private keys of their sensors or other devices.

Embodiments will be discussed herein that provide lightweight pairing and escrow-free authenticated key agreement (AKA) schemes for use in various types of networks, including WSNs. Discussion will include combination of an elliptic curve variant of the MQV, and in particular to the strengthened MQV (SMQV) and public keys generated from implicit certificates, which can fulfill these requirements in an efficient manner. One benefit of implicit certificates is that they can be much shorter than traditional PKI-based certificates, thereby saving storage memory, reducing bandwidth and consequently energy for such transmission. Presented herein is a comparison of the implicitly-certified AKA (iSMQV) protocol according to some embodiments, with existing solutions, showing that such embodiments are better adapted for use in the context of IoT and other constrained scenarios in which key escrow is to be avoided.

With the appearance of highly efficient ECC and bilinear pairing libraries such as MIRACL and RELIC, the ID-based approach for key management in WSNs has gained considerable attention. There are many ID-based AKA schemes that rely on bilinear-pairings over elliptic curves as a way to reduce the amount of information exchanged between nodes in a WSN. These schemes do not address or solve the key escrow issue. There are also a few pairing-based schemes that attempt to do so by adopting a certificate-less paradigm. In these cases, the key escrow problem is avoided by partitioning the private key into two components: a partial identity-based key, generated by the TA and, thus, subject to escrow; and one conventional non-certified partial key, unknown to the TA. All those approaches, however, are affected by attacks against the pairing-friendly curves that would allow them to achieve a reasonably good performance. Therefore, the results obtained with such solutions and their corresponding suitability for use in WSNs has weakness. This is partially due to the desire of using pairing-free, albeit still escrowed, AKA schemes.

Finally, with growing interest in bringing efficient and escrow-less AKA solutions to the context of WSNs, a few pairing-free schemes based on the certificate-less paradigm will be described. In this regard, consider FIG. 2 which is a table showing computations for an assortment of protocols. As shown in this table, some schemes involve more computations than traditional schemes and well analyzed AKA protocols, such as MQV and its variants (e.g., HMQV, and SMQV). This is because they involve a higher number of point multiplications, which is usually much more costly than point additions and hash computations. Nevertheless, these solutions remain potentially more energy efficient than traditional MQV-like schemes due to the reduced size of the messages exchanged between nodes, which is an advantage of the certificate-less paradigm over PKI-based solutions. It is noted that the indicated solutions are actually flawed in that they allow attackers to impersonate any user in the network.

In view of these shortcomings, a present embodiment provides for a highly energy efficient and escrow-free AKA protocol by combining the security and performance of the (S)MQV protocol with implicit certificates, instead of relying on the certificate free paradigm.

The IoT network of FIG. 1, which shows a number of different devices that, with the help of a common KGC 100, are able to bootstrap public/private key pairs {Kpub: Kpriv} and their corresponding implicit certificates. Leveraging this implicit public key validation, any pair of nodes can then use an elliptic curve implementation of SMQV for establishing symmetric keys among themselves. This embodiment of the present invention is depicted in FIG. 3, which is a block diagram of a network utilizing an efficient WSN-oriented AKA scheme that is both pairing-free and escrow-less.

To obtain its public/private key pair, a device interacts with the KGC 100 following the implicit-certificate protocol, such as that presented in FIGS. 4 and 5. In sum, one embodiment provides a protocol that is a blind variant of the Schnorr signature followed by the utilization of the resulting signature as the requester's private key. The security of such procedure relies on: (I) the blind factor generated by the requester A prevents any entity, including the KGC 100, from learning the actual signature ($r_A$) generated, so it can be used as a private key; and (2) the credential ($V_A$) allows anyone to verify that the corresponding public key ($U_A$) was actually signed by the KGC.

As used herein, the global parameters of the protocol are: k is a security parameter and n is a k-bit prime number; G is a group of order n (written additively), with generator G; O is the point at infinity (the group's identity element); and $H_1: \{1, 0\}^* \times G \rightarrow Z^*_n$, is a hash function. The KGC's private key is set to a random:

$$r \xleftarrow{\$} Z^*_n$$

and the corresponding public key is then computed as:

$U + r \cdot G \in \mathbb{G}$.

In some embodiments, the interaction between device A and the KGC allows the former to obtain a private/public key pair and corresponding implicit certificate, as will now be described.

FIG. 4 is a flowchart of a method of computing implicitly certified public and private key pairs for encrypting data. By way of overview, first device 400, which will also be referred to as device A or simply A, obtains (block 405) a random a, and then (block 410) computes V by:

$V \leftarrow \alpha \cdot G$

The first device 400 then sends V and its own identity string ($ID_A$) (block 415) to the KGC 100. The KGC 100 verifies identity string ($ID_A$) and then computes (blocks 420, 425) a credential of:

$V_A \leftarrow V + \beta \cdot G$ for a randomly picked $\beta$. The implicit certificate of device A is the combination of this credential $V_A$ and the identify $ID_A$. The KGC 100 then (block 430) computes:

$h \leftarrow \mathcal{H}_1(ID_A, V_A)$ and creates (block 435) the signature of:

$s \leftarrow h \cdot \beta + r$ and then communicates (block 440) to device A 400 the signature s and credential $V_A$.

Device A 400 then computes (block 445) its implicitly certified public and private keys. As an example, device A computes:

$h \leftarrow \mathcal{H}_1(ID_A, V_A)$ as it was done by the KGC 100. Then, the device A sets (block 450) its own long-term private key to:

$r_A \leftarrow h \cdot \alpha + s$ whose value is unknown to the KGC due to the blinding factor $\alpha$. The corresponding long-term public key $U_A$ is then (block 455) computed as:

$U_A \leftarrow r_A \cdot G$

If desired, the validity of the triple $ID_A$, $U_A$, $V_A$ can be verified (block 460) by any entity by checking if the following is true:

$$U_A \overset{?}{=} h \cdot V_A + U.$$

No particular format is necessary for the device's identity ($ID_A$) and the format and values used may be varied to satisfy any application-specific concerns. For example, the application could require the device's owners to authenticate themselves toward the KGC 100 and then provide a "friendly name" for each new device registered, so that the device's identifier would be a combination of the user's ID and the device's given name. Other examples of widely used identifiers are the Universal Subscriber Identity Module (USIM) of a mobile device, a common Universal Resource Identifier (URI), and the like.

With this overview and referring still to FIG. 4, block 405 includes obtaining a random number ($\alpha$), and block 410 shows computing a random point (V) on an elliptic curve as being a product of the random number ($\alpha$) and a pre-agreed point (G) on the elliptic curve that is a generator of a finite field.

At block 415, the first device 400 communicates, to a key generation center (KGC) 100, the computed first random point (V), and identity data ($ID_A$) that identifies the first device 400.

Block 420, at KGC 100, obtains a random number (13), and then the method computes the random point ($V_A$) on the elliptic curve by adding the random point (V) from the first device 400 to a product of the random number (13) and the pre-agreed point (G) on the elliptic curve (block 425).

Block 430 computes a first hash value (h) by applying a hash function ($H_1$) to the identity data ($ID_A$) of the first device 400 and the random point ($V_A$) on the elliptic curve.

Block 435 includes computing a signature (s) by adding a private key (r) to a product of the first hash value (h) and the random number ($\beta$).

At block 440, the first device 400 receives, from the KGC 100, the signature (s) and the random point ($V_A$) on the elliptic curve.

Block 445 computes the first hash value (h) by applying the hash function ($H_1$) to the identity data ($ID_A$) of the first device 400 and the random point ($V_A$) on the elliptic curve.

Block 450 refers to computing a first private key ($r_A$) by adding the signature (s) to a product of the first hash value (h) and the random number ($\alpha$).

At block 455, the method computes a first public key ($U_A$) as being a product of the first private key ($r_A$) and the pre-agreed point (G) on the elliptic curve.

Block 460 then performs verifying the first public key ($U_A$) as correct when the first public key ($U_A$) equals a product of the first hash value (h) and the random point ($V_A$) on the elliptic curve, as added to a public key (U) of the KGC.

The obtaining of block 420 is shown occurring after block 415, but this is not a requirement and the functions of block 420 may also be done prior to block 415.

FIG. 5 is a flowchart of a method for computing a shared key for encrypting data between first and second devices.

By way of overview, after the bootstrapping phase (e.g., FIG. 4) is complete, any pair of devices, such as first device 400 and second device 502 (also referred to as device A and device B) can engage in authenticated key agreement (AKA) for establishing symmetric keys. This is done using the EC-based implementation of a SMQV as shown in FIG. 5.

In some embodiments, the protocol may include: (1) an authenticated version of an EC-based, Diffie-Hellman protocol, in which the participating entities' public keys $U_A$ and $U_B$ are verified using implicit certificates; followed by (2) a form of "challenge-response signature", ensuring that the challenger and signer can both compute the same digital signature of:

$\sigma$ and then (3) using this signature, together with the entities' identities, to derive a common key K.

In addition to the previously-generated implicitly certified keys, this protocol uses two extra hash functions, examples of which are as follows:

$$\mathcal{H}_2: \mathbb{G} \times \mathbb{G} \times (\{1,0\}^* \times \mathbb{G} \times \mathbb{G}) \times (\{1,0\}^* \times \mathbb{G} \times \mathbb{G}) \to \mathbb{Z}^*_n$$
$$\mathcal{H}_3: \mathbb{G} \times (\{1,0\}^* \times \mathbb{G} \times \mathbb{G}) \times (\{1,0\}^* \times \mathbb{G} \times \mathbb{G}) \times \mathbb{G} \times \mathbb{G} \to \mathbb{Z}^*_n$$

First, both parties (e.g., first device 400 and second device 502) execute a regular Diffie-Hellman protocol, picking a random x as an ephemeral secret (blocks 505, 605), and then compute (blocks 510, 610) an ephemeral public key, which is generically stated as follows:

$X \leftarrow x \cdot G$, and exchanging the result (block 515). In addition, the devices also exchange their IDs and (implicitly-certified) long-term public keys Y.

Next, the devices verify the validity of the public keys received from each other (blocks 520, 525, 620, 625). As described in more detail later, the validity procedure by itself does not ensure that the entities are the rightful owners of that public key. However, it ensures that only someone that interacted with the KGC 100 for creating the public key (U, V) knows the corresponding private key, and thus, will be able to complete the protocol. Therefore, in some embodiments, each party proceeds with the protocol only if the received public key is valid.

Both parties then compute (blocks 530, 535, 630, 635) two hashes (d and e) from the public information previously exchanged, and combine them with their own private keys for computing (blocks 540, 640) the digital signature of:

$\sigma$.

The shared key K is them computed (blocks 545, 645) by hashing the publicly exchanged information with the digital signature of:

$\sigma$.

Next, the communicating parties may engage in any suitable key confirmation protocol 550 aiming to ensure that both parties or devices were able to compute the same value for K. For example, they could use K to compute the message authentication code (MAC) corresponding to the previously exchanged variables, in a given order, and then exchange and verify each other's values.

It is noted that this key confirmation can be sent by the protocol's responder together with its long and ephemeral public keys, so that only the protocol's initiator needs to send a second message at the end of the protocol. In this case, the responder would need to perform the noted operations of the protocol and compute the shared key K before answering to the initiator's request.

With this overview and referring still to FIG. 5, block 505 includes obtaining a random number ($x_A$), and block 510 includes computing a first private ephemeral key ($X_A$) as being a product of the random number ($x_A$) and a pre-agreed point (G) on an elliptic curve, that is a generator of a finite field.

Block 515 includes one communication, from the first device 400 to the second device 502, of the first private ephemeral key ($X_A$), and a first parameter set ($Y_A$), such that the first parameter set ($Y_A$) includes the identity data ($ID_A$) that identifies the first device 400, the random point ($V_A$) on the elliptic curve, and the first public key ($U_A$).

Block 515 includes a second communication, from the second device 502 to the first device 400, of a second private ephemeral key ($X_B$) and a second parameter set ($Y_B$), such that the second parameter set ($Y_B$) includes identity data ($ID_B$) identifying the second device 502, a random point ($V_B$) on the elliptic curve, and a second public key ($U_B$). The second parameter set ($Y_B$) can be generated by second device 502 in a manner similarly to that used to generate the first parameter set ($Y_A$), such that the second parameter set ($Y_B$) can be generated using the protocol in FIG. 4.

Block 520 includes verifying the second public key ($U_B$) as valid when the second public key ($U_B$) equals a hash function ($H_1$) applied to the identity data ($ID_B$) and the random point ($V_B$) on the elliptic curve, which is multiplied by the random point ($V_B$) on the elliptic curve, and as added to the public key (U) of the KGC 100.

Block 525 verifies the second public key ($U_B$) and the second private ephemeral key ($X_B$) as valid when both the second public key ($U_B$) and the second private ephemeral key ($X_B$) are not a point at infinity on an underlying elliptic curve.

Block 530 computes a hash value (d) by applying a hash function ($H_2$) in order to the first private ephemeral key ($X_A$), the second private ephemeral key ($X_B$), the first parameter set ($Y_A$), and the second parameter set ($Y_B$).

Block 535 then computes a hash value (e) by applying a hash function ($H_2$) in order to the second private ephemeral key ($X_B$), the first private ephemeral key ($X_A$), the first parameter set ($Y_A$), and the second parameter set ($Y_B$).

Block 540 computes a first value by adding the first private key ($r_A$) to a product of the random number ($x_A$) and the second hash value (d), computes a second value by adding the second public key ($U_B$) to a product of the hash value (e) and the second private ephemeral key ($X_B$), and then computes a random seed (s) as being a product of the first value and the second value.

Block 545 computes a shared key (K) by applying a hash function ($H_3$) in order to the random seed (s), the first parameter set ($Y_A$), the second parameter set ($Y_B$), the first private ephemeral key ($X_A$), and the second private ephemeral key ($X_B$). In some embodiments, this computing of the shared key (K) occurs when the second public key ($U_B$) is verified in block 520, or when the second public key ($U_B$) and the second private ephemeral key ($X_B$) are all verified as valid in block 525, or when both blocks 520 and 525 are verified as valid.

The assorted functions of blocks 605 through 645, performed by the second device 502 can be performed in a manner similarly to that done by the first device 400 with respect to blocks 505-545.

Block 550 includes a key confirmation operation in which the first and second devices confirm their respective shared keys. If desired, first device 400 can communicate data to the second device 502 in a manner such that the data is encrypted or is otherwise authenticated using the shared key (K).

Addressing now various security considerations, implicit certificates have many desirable features. One feature is where the data required for public key validation using the approach presented herein is much shorter than that what can be obtained with traditional PKI-based certificates, for example, leading to reduced memory and communication overheads. For example, while a typical RSA certificate already carrying the subject's public key $U_A$ is 2-4 KiB long, using an implicit certificate, all that is needed is to present two elliptic curve points ($U_A$ and $V_A$) (approximately 4 k bits for the desired security level k) together with the identifier of device A.

The cost for the increased efficiency obtained with implicit certificates is that they are unable to bind an identifier to a public key a priori. Generally the only way to know that the public key presented by a node A is genuinely bound to its identity is to successfully run the SMQV protocol, receiving a valid confirmation from A, as the proof that A knows the corresponding private key lies on the ability to use the latter. This happens because, unlike a typical PKI, there is no process by which the certification authority (CA) requires a node to prove knowledge of the private key before issuing a certificate. In most cases, the scheme does not prevent a malicious node E, for example, from building an apparently valid implicit certificate for an arbitrary identity. Again, there is no digital signature for proving that this association is valid, and thus E could compute:

$$U_E = \mathcal{H}_{(ID_E, V_E)} \cdot V_E + U$$

from an arbitrarily $V_E$. However, embodiments of the present invention ensure that, unless that node first interacts with the CA (e.g., KGC 100), the private key corresponding to $U_E$ cannot be computed by the node on its own. This characteristic would still allow E to, for example, flood the network with messages containing this "fake" public key and implicit certificate, aiming to exhaust their neighbors' energy resources. Nevertheless, a similar resource exhaustion attack could be perpetrated by a node that captures and repeatedly presents a valid (e.g., PKI-based) certificate claiming to own it. In both cases, the AKA protocol is deemed to fail after the protocol is run and the corresponding resources are wasted. Since capturing valid certificates in the WSN scenario is not overly difficult, the energy savings provided by implicit certificates seems to largely overshadow this slight, if any, drawback of the scheme.

In general, the SMQV protocol is an authenticated version of the basic Diffie-Hellman protocol and is itself based on the known MQV protocol. Its adoption in the context of WSNs is interesting mainly due to its remarkable performance, even in constrained platforms. In addition, SMQV displays many interesting security features defined by the seCK security model, such as resistance to impersonation, man-in-the-middle-attacks, unknown key share and (key compromise) impersonation, side channel attacks aiming to reveal the static private keys, as well as perfect forward security of past session keys (assuming the protocol includes key confirmation, as done with iSMQV). One concern with protocols of the MQV family is that, if the receiver of a (long-term or ephemeral) public key does not verify whether the point coordinates lie on the appropriate elliptic curve, it becomes open to attacks. Specifically, for the 2-message version adopted in iSMQV, the absence of such verification allows an active attacker who learns an ephemeral secret $X_A$ of node A to reveal that node's long-term key $r_A$. This validation is not strongly required in the context of WSNs, however, because the ephemeral secrets x generated by the nodes are not expected to be more vulnerable to attacks than their long-term secrets r. Actually, quite the opposite occurs. To compromise the ephemeral keys, an attacker would have to capture the node before it is removed from the device's memory. By doing so, the attacker would also likely be able to directly recover the long-term key from the device's memory, so there is no point in attacking it indirectly using ephemeral keys. Therefore, according to an embodiment, it becomes only necessary to check for non-zero public keys, as done in FIG. 5, blocks 525, 625, of the iSMQV's key agreement phase.

In accordance with some embodiments, the iSMQV protocol builds on the implicit certificates and the SMQV constructions and, thus, is expected to inherit their combined security properties. Specifically, SMQV's setup requires a communicating entity A who has a valid public/private key pair, where the private key $r_A$ is random and the public key is computed as:

$$U_A \leftarrow r_A \cdot G$$

and is also different from O. It does not impose any specific method for verifying the binding between an entity and its key pair. In this context, the implicit certificate approach in accordance with the present disclosure provides this verification method, since it is infeasible to forge a valid public/private key pair (($U_A$), ($V_A$), ($r_A$)) under this setting. It is further understood that as required by SMQV, a valid private key $r_A$ generated using the implicit certificate protocol is indistinguishable from a purely random one, since, as shown in FIG. 4, it depends on random contributions from both the user and the trusted agent, such as the KGC 100.

Aiming to assess the actual computational costs of iSMQV and the other escrow-free schemes shown in the table of FIG. 2, such schemes were implemented and benchmarked considering as metrics execution time and energy consumption both for computation and data communication. All implementations were done using TinyECC 2.0, an open-source and lightweight cryptographic library with support to elliptic curves over prime fields. TinyECC was adopted due to its efficient implementation, specifically built for memory-constrained devices, which also provides configuration options for obtaining a reduced program size and, thus, fit in a wide range of constrained platforms. The curves employed for all algorithms are SECP160r1 (security level of 80 bits).

An example of such devices, MEMSIC TelosB motes (TPR2420CA) were utilized. This sensor platform is equipped with a 8 MHz Texas Instruments MSP430 (MSP430F1611) microcontroller, 10 kB of internal RAM, 48 kB of programmable flash, and a CC2420 radio chip. The actual operation frequency of the MSP430 microcontroller was 4.19 MHz, which is below the maximum 8 MHz because to operate at full speed it would typically require an external oscillator and at least 3.6V of input voltage, while TelosB is powered with 3.0V (two 1.5V AA batteries). The operating system employed was a TinyOS, version 2.1.2.

A test approach adopted was that the energy consumption and execution time are directly measured on the TelosB motes after its radio is turned off. The energy source implemented was an Agilent E3631A power supply configured to provide 3.0V. An Agilent 34401A digital multimeter was used to measure the system current flow as the different algorithms were executed. The data measured in this manner is sent to a computer through a GPIB cable, and displayed in LabView. The multimeter was configured to provide a reading rate of 60 Hz, allowing both steady-state currents and transients to be measured.

The current drained in idle mode, is as follows:

$I_{idle} \leq 1.2$ mA and differs from that drained while some processing is being performed, which is as follows:

1.8 mA $\leq I \leq$ 2.4 mA allowing the execution times to be determined from the observation of transients.

After eliminating the influence of the current drained when the system is not executing the task, is reflected by:

$I_{idle} = 0.12$ mA

The energy consumption E is obtained as the time integration of the total current drained I multiplied by the (constant) voltage V used to power up the mote. This is expressed as follows:

$E = V \times \int_t (I - I_{idle}) dt.$

FIG. 6 is a table showing the average running times of the following key agreement protocols: SMQV with implicit certificates, Tu's, Tong's and Ni's solutions, and the iSMQV protocol set out in FIGS. 4 and 5. In each set of measurements, the relative standard deviation remains below 0.7%, so it is omitted for simplicity. This table includes both the time taken for the communication and computation parts of the schemes and it also considers the bootstrapping of the nodes' public/private key pairs (left side of the table) and the key agreement protocol itself (right side of the table). TelosB nodes were used as the platform for running all operations. The key bootstrapping process in the certificate-less and implicitly certified settings run in similar times, with a slight advantage to the KGC's side when the latter approach is adopted (a gain of approximately 30%). Analyzing the authenticated key agreement operation, on the other hand, iSMQV of the present disclosure runs 20-30% faster than the other tested solutions.

In addition, as shown in FIG. 7, which is a table depicting average energy consumption for different AKA schemes, it can be seen that the iSMQV of the present disclosures is also more efficient in terms of energy consumption. The amount of data transmitted during the protocol is at most as high as that observed in the certificate-less protocols analyzed, and its reduced processing costs lead to a lower overall energy usage. In these measurements, the relative standard deviation obtained was below 2.2%.

In view of this data, the advantage from the KGC's side in bootstrapping keys with implicit certificates is unlikely to be very relevant in practice since the KGC role is more commonly implemented by a server instead of a mote or other device, and thus, the hardware employed is generally much less resource constrained than that utilized in the configurations herein. Thus, such performance and energy gains observed in iSMQV's key bootstrapping procedure of the present disclosure has interest in scenarios in which trusted nodes on the network act as KGCs after the original deployment (e.g., for rekeying purposes).

The key establishment procedure, on the other hand, is more significant because it is generally performed at least once by every pair of nodes that wish to establish a secure communication channel. In a scenario in which nodes are fixed and there is little risk of them being physically captured by attackers, for example, a single execution of the protocol per pair of motes may be sufficient, as then each node may keep the keys shared with its neighbors in memory for a long time. When the nodes are mobile, however, each mote's neighbors may change quite often, so it may be preferable in those scenarios to establish new keys for each session, thus saving memory. The same applies for scenarios subject to node capture security, in which session keys are required for preserving the confidentiality of communications that occurred before the attacker obtained the node's private keys (forward secrecy), or when session-oriented protocols such as Transport Layer Security (TLS) are employed. Especially in those latter cases, the performance of the key establishment procedure becomes critical, in particular if a comparison is made between the ≈100 mJ taken by the iSMQV with other operations commonly performed by motes. Sensing on a TelosB node running TinyOS can take from 0.07 to 0.33 mJ (for light and temperature readings, respectively), whereas the transmission of 12 bytes of data consumes roughly 33 mJ. Thus, establishing a key is approximately 3 to 1,430 times more energy consuming than such typical tasks. In terms of battery lifetime, though, establishing a new key for every session is not totally unfeasible, as a node powered by two AA alkaline batteries will still have approximately 24,600 J of energy available, meaning that 0.1% of this energy allows the execution of more than 200 key agreement procedures.

The need for lightweight device-to-device authentication in WSNs has recently led to the proposal of many authenticated key-agreement (AKA) schemes focused on this scenario. However, many of these proposed schemes (especially those based on the ID-based paradigm) suffer from key escrow, which is generally undesirable in the large scale and multi-user environment that characterizes the Internet of Things (IoT). As such, the escrow-free alternatives presented herein fulfill the need for IoT scenarios, such that SMQV protocol combined with implicit certificates meet such needs. This combination not only avoids the transmission costs of full-fledged PKI-based certificates, but also leads to a scheme that is more efficient than similar-purpose lightweight solutions. In addition, other prior AKA schemes claim levels of efficiencies, such schemes suffer from severe security flaws, which indicate that bringing significant improvements over SMQV, for example, is not an easy task.

FIG. 8 is a block diagram of a device 800 in accordance with the present disclosure. In accordance with embodiments of the present invention, the assorted devices presented herein, including those depicted in FIGS. 1 and 2, may be variously implemented using some or all of the features of device 800. Examples of such devices include sensors, mobile devices, base stations, cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like. By way of non-limiting example only, description herein is made with reference to particular types of devices. However, such teachings apply equally to other types of devices. In addition, these teachings may also be applied to stationary terminals or devices such as digital TV, desktop computers, and the like.

Device 800 includes a wireless communication unit 805, memory 810, and a controller 815. FIG. 8 illustrates the device having various components, but it is understood that implementing all of the illustrated components is not a requirement, and that greater or fewer components may alternatively be implemented.

Communication unit 805 typically includes one or more modules which permit wired or wireless communications between the device 800 and a communication system or network, between the device and another device, between the device and an external server, and other communications. In some embodiments, communication unit 805 may transmit/receive wireless signals to/from at least one network entity such as, for example, a base station, an external terminal, a server, and the like, of a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

If desired, communication unit 805 may alternatively or additionally transmit/receive wireless signals via communication networks according to wireless Internet technologies. Examples of such wireless Internet access include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. Other suitable technologies for implementing short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like.

The memory 810 may store a plurality of application programs (or applications) executed in the device 800, data for operations of the device 800, instruction words, and the like. The memory 810 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the device 800 may be operated in relation to a web storage device that performs the storage function of the memory 810 over the Internet or other network.

The controller 815 may typically control the general operations of the device 800, along with performing various encryption schemes presented herein (e.g., protocols of FIGS. 4 and 5). As such, various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

Various embodiments of the present invention have been described, but still further features may alternatively or additionally be implemented in accordance with alternative embodiments of the present invention. Although embodiments may be implemented using the exemplary series of operations described herein (e.g., in conjunction with the various flowcharts discussed above), additional or fewer operations may be performed.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

The invention claimed is:

1. A method for computing a shared key (K) for encrypting data, the method comprising:
communicating, from a first device to a second device, a first private ephemeral key ($X_A$), and a first parameter set ($Y_A$), wherein the first parameter set ($Y_A$) includes identity data ($ID_A$) that identifies the first device, a random point ($V_A$) on an elliptic curve, and a first public key ($U_A$); receiving, from the second device, a second private ephemeral key ($X_B$) and a second parameter set ($Y_B$), wherein the second parameter set ($Y_B$) includes identity data ($ID_B$) that identifies the second device, a random point ($V_B$) on the elliptic curve, and a second public key ($U_B$);
verifying the second public key ($U_B$) as valid when the second public key ($U_B$) equals a hash function ($H_1$) applied to the identity data ($ID_B$) and the random point ($V_B$) on the elliptic curve, which is multiplied by the random point ($V_B$) on the elliptic curve, and as added to a public key (U) of a trusted agent;
verifying the second public key ($U_B$) and the second private ephemeral key ($X_B$) as valid when both the second public key ($U_B$) and the second private ephemeral key ($X_B$) are not a point at infinity on the elliptic curve; and
computing the shared key (K) based at least on the first parameter set ($Y_A$), the second parameter set ($Y_B$), the first private ephemeral key ($X_A$), and the second private ephemeral key ($X_B$).

2. The method of claim 1, further comprising:
computing a random point (V) on the elliptic curve as being a product of a random number ($\alpha$) and a pre-agreed point (G) on the elliptic curve that is a generator of a finite field;
communicating, to the trusted agent, the first random point (V), and the identity data ($ID_A$) that identifies the first device; and receiving, from the trusted agent, a signature (s) and the random point ($V_A$) on the elliptic curve, wherein the random point ($V_A$) was computed by the trusted agent by adding the random point (V) from the first device to a product of a random number ($\beta$) and the pre-agreed point (G) on the elliptic curve.

3. The method of claim 2, wherein the signature (s) was computed by adding a private key (r) to a product of a first hash value (h) and the random number ($\beta$).

4. The method of claim 3, wherein the first hash value (h) was computed by applying a hash function ($H_1$) to the identity data ($ID_A$) of the first device and the random point ($V_A$) on the elliptic curve.

5. The method of claim 1, further comprising:
computing a first hash value (h) by applying the hash function ($H_1$) to the identity data ($ID_A$) of the first device and the random point ($V_A$) on the elliptic curve;
computing a first private key ($r_A$) by adding a signature (s) to a product of the first hash value (h) and a random number ($\alpha$);
computing the first public key ($U_A$) as being a product of the first private key ($r_A$) and a pre-agreed point (G) on the elliptic curve; and
verifying the first public key ($U_A$) as correct when the first public key ($U_A$) equals a product of the first hash value (h) and the random point ($V_A$) on the elliptic curve, as added to the public key (U) of the trusted agent.

6. The method of claim 1, further comprising:
computing a hash value (d) by applying a hash function ($H_2$) in order to the first private ephemeral key ($X_A$), the second private ephemeral key ($X_B$), the first parameter set ($Y_A$), and the second parameter set ($Y_B$);
computing a hash value (e) by applying a hash function ($H_2$) in order to the second private ephemeral key ($X_B$), the first private ephemeral key ($X_A$), the first parameter set ($Y_A$), and the second parameter set ($Y_B$);
computing a first value by adding a first private key ($r_A$) to a product of a random number ($x_a$) and the second hash value (d);
computing a second value by adding the second public key ($U_B$) to a product of the hash value (e) and the second private ephemeral key ($X_B$);
computing a random seed (s) as being a product of the first value and the second value; and
performing the computing of the shared key (K) by applying a hash function ($H_3$) in order to the random seed (s), the first parameter set ($Y_A$), the second parameter set ($Y_B$), the first private ephemeral key ($X_A$), and the second private ephemeral key ($X_B$).

7. The method of claim 1, further comprising:
performing the computing of the shared key (K) when the verifying the second public key ($U_B$), and the verifying the second public key ($U_B$) and the second private ephemeral key ($X_B$), are all verified as valid.

8. The method of claim 1, wherein the trusted agent includes a key generation center (KGC).

9. An apparatus for computing a shared key (K) for encrypting data, the apparatus comprising:
a memory configured to store identity data ($ID_A$) that identifies the apparatus;
a communication unit; and
a controller operatively coupled to the communication unit, wherein the controller is configured to:
control the communication unit to communicate, to a second device, a first private ephemeral key ($X_A$), and a first parameter set ($Y_A$), wherein the first parameter set ($Y_A$) includes the identity data ($ID_A$) that identifies the apparatus, a random point ($V_A$) on an elliptic curve, and a first public key ($U_A$);
control the communication unit to receive, from the second device, a second private ephemeral key ($X_B$) and a second parameter set ($Y_B$), wherein the second parameter set ($Y_B$) includes identity data ($ID_B$) that identifies the second device, a random point ($V_B$) on the elliptic curve, and a second public key ($U_B$);
verify the second public key ($U_B$) as valid when the second public key ($U_B$) equals a hash function ($H_1$) applied to the identity data ($ID_B$) and the random point ($V_B$) on the elliptic curve, which is multiplied by the random point ($V_B$) on the elliptic curve, and as added to a public key (U) of a trusted agent;
verify the second public key ($U_B$) and the second private ephemeral key ($X_B$) as valid when both the second public key ($U_B$) and the second private ephemeral key ($X_B$) are not a point at infinity on the elliptic curve; and
compute the shared key (K) based at least on the first parameter set ($Y_A$), the second parameter set ($Y_B$), the first private ephemeral key ($X_A$), and the second private ephemeral key ($X_B$).

10. The apparatus of claim 9, wherein the controller is further configured to:
compute a random point (V) on the elliptic curve as being a product of a random number ($\alpha$) and a pre-agreed point (G) on the elliptic curve that is a generator of a finite field;
control the communication unit to communicate, to the trusted agent, the first random point (V), and the identity data ($ID_A$) that identifies the apparatus; and
control the communication unit to receive, from the trusted agent, a signature (s) and the random point ($V_A$) on the elliptic curve, wherein the random point ($V_A$) was computed by the trusted agent by adding the random point (V) from the apparatus to a product of a random number ($\beta$) and the pre-agreed point (G) on the elliptic curve.

11. The apparatus of claim 10, wherein the signature (s) was computed by adding a private key (r) to a product of a first hash value (h) and the random number ($\beta$).

12. The apparatus of claim 11, wherein the first hash value (h) was computed by applying a hash function ($H_1$) to the identity data ($ID_A$) of the apparatus and the random point ($V_A$) on the elliptic curve.

13. The apparatus of claim 9, wherein the controller is further configured to:
compute a first hash value (h) by applying the hash function ($H_1$) to the identity data ($ID_A$) of the apparatus and the random point ($V_A$) on the elliptic curve;
compute a first private key ($r_A$) by adding a signature (s) to a product of the first hash value (h) and a random number ($\alpha$);
compute the first public key ($U_A$) as being a product of the first private key ($r_A$) and a pre-agreed point (G) on the elliptic curve; and
verify the first public key ($U_A$) as correct when the first public key ($U_A$) equals a product of the first hash value (h) and the random point ($V_A$) on the elliptic curve, as added to the public key (U) of the trusted agent.

14. The apparatus of claim 9, wherein the controller is further configured to:
compute a hash value (d) by applying a hash function ($H_2$) in order to the first private ephemeral key ($X_A$), the second private ephemeral key ($X_B$), the first parameter set ($Y_A$), and the second parameter set ($Y_B$);

compute a hash value (e) by applying a hash function ($H_2$) in order to the second private ephemeral key ($X_B$), the first private ephemeral key ($X_A$), the first parameter set ($Y_A$), and the second parameter set ($Y_B$);

compute a first value by adding a first private key ($r_A$) to a product of a random number ($x_a$) and the second hash value (d);

compute a second value by adding the second public key ($U_B$) to a product of the hash value (e) and the second private ephemeral key ($X_B$);

compute a random seed (s) as being a product of the first value and the second value; and perform the computing of the shared key (K) by applying a hash function ($H_3$) in order to the random seed (s), the first parameter set ($Y_A$), the second parameter set ($Y_B$), the first private ephemeral key ($X_A$), and the second private ephemeral key ($X_B$).

15. The apparatus of claim 9, wherein the controller is further configured to:

perform the computing of the shared key (K) when the verifying the second public key ($U_B$), and the verifying the second public key ($U_B$) and the second private ephemeral key ($X_B$), are all verified as valid.

16. The apparatus of claim 9, wherein the trusted agent includes a key generation center (KGC).

* * * * *